June 19, 1928. 1,674,369
T. H. McQUINN
ELECTRIC LIQUID HEATER
Filed Oct. 4, 1926 2 Sheets-Sheet 1
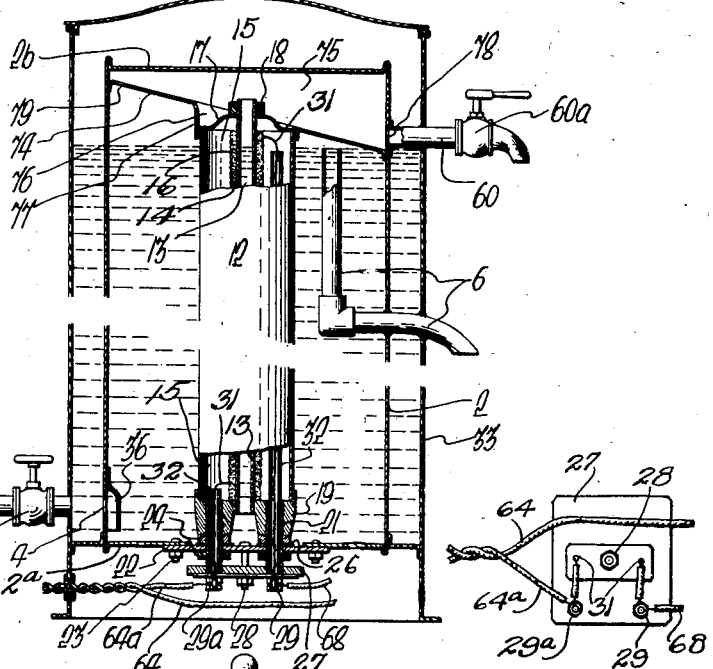
INVENTOR
T. H. McQUINN Patented June 19, 1928.

1,674,369

UNITED STATES PATENT OFFICE.

THOMAS HORACE McQUINN, OF PRESTON, VICTORIA, AUSTRALIA, ASSIGNOR TO HARRY MORTON SARGOOD, OF TOORAK, VICTORIA, AUSTRALIA.

ELECTRIC LIQUID HEATER.

Application filed October 4, 1926, Serial No. 139,519, and in Australia November 13, 1925.

This invention relates to electric liquid heaters such as urns, café fountains, boilers and the like, of the kind having one or a plurality of heating elements, each comprising an inner tube having an electrical resistance coiled thereon and enclosed by an outer tube or casing which is closed at its ends by end fittings, the unit, comprising the resistance covered tube, the outer casing and the end fittings, being disposed within a liquid reservoir so that the interior of the inner tube provides a passageway through which the liquid to be heated is induced upwardly by thermosyphonic action. The efficiency of such electric heaters depends to a considerable extent upon a rapid induced upward circulation of the liquid through the heating tube, but in existing heaters of the kind indicated, the outer casing usually so closely surrounds the heating tube as to absorb a considerable portion of the heat from the heating coil, whereby the tube itself is heated to a lesser degree and consequently the induction of water passing through the tube is rendered less rapid.

One of the objects of the present invention is to provide in an electric liquid heater of the kind indicated an improved construction and arrangement of a heating tube, an outer casing, and end closures or fittings for said casing and tube, which will ensure a most rapid induction of the liquid through the heating tube which is sufficiently isolated from its outer casing to ensure that it will derive the maximum heat from the resistance thereon. This object is attained primarily by employing a heating tube of relatively small diameter, say, for example, about one-quarter of an inch internal diameter, upon which an electric resistance is coiled and suitably insulated therefrom, the resistance covered tube being concentrically located within an outer casing of relatively large diameter so that a heat insulating space or chamber of annular formation is formed between the resistance covered tube and the internal surface of the outer casing, the heat insulating chamber being closed at its ends by the aforesaid end fittings.

Owing to the marked difference in diameters of the heating tube and the outer casing as aforesaid, the rates of expansion of such parts will vary considerably when the heater is in use, and to prevent this difference in the rates of expansion from causing leakage around the end fittings one of the latter is, in accordance with this invention, of a flexible or expansible nature and is so attached to the heating tube and the outer casing that the said fitting can expand and contract with the heating tube without affecting its attachment to the tube and the outer casing.

The invention also contemplates an electric liquid heater having a heating element arranged and constructed as before mentioned and provided with two separate and independent draw-off pipes, and simple and effective means whereby only boiling liquid may be drawn off by one pipe, while liquid at any temperature prevailing within the heating vessel and may be drawn off from the other pipe. This is effected by providing a chamber above the normal level of the liquid within the heating vessel and arranging for the upper end of the heating tube to communicate directly with such chamber so that the boiling liquid gushes from said heating tube into the aforesaid chamber from which one of the draw off pipes leads, the other draw off pipe leading from the upper part of the heating vessel externally of the heating tube and beneath the aforesaid chamber.

Referring to the drawings, which form part of this specification:

Figure 1 is a vertical section of an electric liquid heater according to the present invention, capable of supplying boiling liquid and hot or warm liquid simultaneously.

Figure 2 is a vertical section of an electric liquid heater according to this invention and incorporating constructional modifications.

Figure 3 is a fragmentary underneath view of Figure 1.

Figure 4:
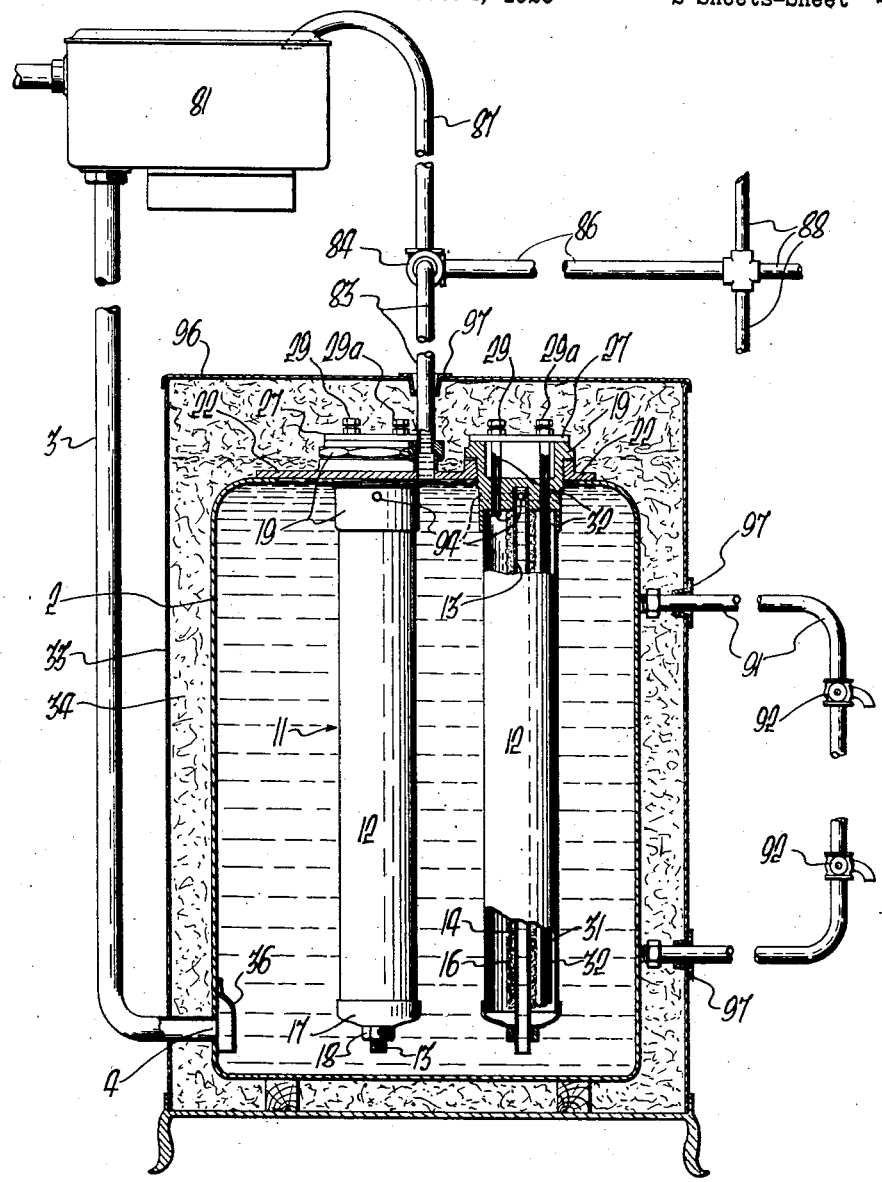
Figure 4 is a vertical section of an electric liquid heater and pipe connections, in accordance with this invention, suitable for a domestic or like hot water service installation.

A liquid heater or boiler in accordance with the invention includes a tank or reservoir 2 of suitable shape and dimensions, but preferably cylindrical. A supply pipe 3 conducts the liquid into the reservoir 2 by way of an inlet opening 4 near the bottom thereof and leading from the upper part of the reservoir is an outlet or draw off pipe 6.

A tap or valve 9 may be fitted to the supply pipe 3 as seen in Figure 1 so that by admitting the desired quantity of cold liquid into the lower part of the reservoir, a corresponding quantity of the heated liquid will pass off from the upper part thereof through the outlet pipe 6.

Within the reservoir are one or more hollow or tubular electric heating elements, each element being enclosed by a casing, hereinafter referred to, so as to form a unit, indicated by the numeral 11, which may be readily inserted within, and removed from, the reservoir. Each of these elements is preferably mounted in a substantially vertical or upwardly extending attitude so that the liquid entering the lower part of the reservoir is induced upwardly through the interior of the hollow element by thermo syphonic action, and escapes from the upper end thereof. The liquid is thus rapidly heated during its natural upward course through the heating element, and the hottest part of the liquid within the reservoir is located at the upper part thereof adjacent the entrance of the outlet pipe 6. The body of liquid surrounding the heating element is thus raised in temperature from its upper part downwardly by convection which is set up by the liquid being drawn upwardly through the heating element. The main body of liquid also receives heat by conduction from a casing 12 enclosing the heating element.

Each hollow heating element preferably comprises a brass or copper tube 13 of small diameter, say, for example, about one-quarter of an inch internal diameter, which extends centrally from end to end of the heating element so as to form an open ended passage through which the liquid to be heated is induced towards the top of the reservoir 2 as before mentioned. The greater part of the tube 13 is covered externally by a suitable nonconductor of electricity which is heat refractory, such, for example, as asbestos, silica or the like. A thin coating 14 of such material may readily be formed around the tube 13, whereupon a high resistance wire 16 is spirally wound upon the coating from end to end thereof. The element thus constructed is enclosed concentrically within the casing 12, which is of relatively large diameter, so as to provide a heat insulating space or chamber 15 of annular form between the resistance covered tube 13 and the outer casing 12, the latter and said chamber being suitably closed preferably by end fittings to protect the resistance wire from contact with the surrounding liquid within the reservoir.

The effects of the relatively small diameter heating tube 13, the relatively large outer casing 12 and the heat insulating chamber 15, are to isolate the tube from the casing and to minimize the amount of heat absorbed by the casing from the resistance 16. The heat of the resistance 16 is thus concentrated about the tube 13 which causes the relatively small quantity of liquid in the tube to be heated to a high degree and initiates and maintains a very rapid upward induction of liquid through the tube.

The fitting at one end of the element may consist of a cap 17 formed of relatively thin copper, and having a central aperture to pass the adjacent end portion of the tube 13 which may be screw threaded to receive a nut 18 whereby the cap is securely retained to the tube 13; the lip 17$^a$ of the cap being screwed, brazed or soldered around the end portion of the casing 12. By this construction, any variation in the rates of expansion of the casing 12 and the tube 13 (that of the latter generally being the greater) will be counteracted by the cap 17 which, owing to its flexibility, can expand and contract with the tube 13 without affecting its attachment to the casing 12.

The fitting 19 at the other end of the element has a central aperture into which the tube 13 may be screwed, and this fitting may be adapted to serve for mounting the element to the bottom 2$^a$ or any other part of the reservoir and also to provide insulated passages for conductors which lead current to the resistance wire 16. Accordingly the fitting 19 may be provided with bosses having screw threaded longitudinal apertures in which hollow metal shanks 21 are screwed. These shanks extend downwardly beyond the bosses and may pass through a mounting plate 22 which may be attached by screws 23 to the bottom 2$^a$ of the reservoir around an opening formed therein. Nuts 24 encircling the hollow shanks 21 retain the unit 11 to the latter and in the desired attitude within the reservoir. Jointing washers or packing 26 may provided between the reservoir bottom and the mounting plate 22 and between the latter and the nuts 24 in order to prevent leakage from the reservoir. The hollow shanks 21 are screwed at their outer extremities into a plate 27 of insulating material, which may also be supported from the reservoir bottom by a screw and nut 28, this insulatory plate carrying terminals 29, 29$^a$ to which conductors 31 for the resistance wire lead. To insulate these conductors from the hollow shanks, tubes 32 of nonconductive material, such, for example, as silica, may be disposed within the shanks, the conductors 31 passing through the insulatory tubes. One of these insulatory tubes may be extended to a point adjacent the upper end of the element to prevent the conductor 31 from contacting with the casing 12 and also with the lower or any portions of the resistance wire 14. It will be evident that series of insulatory beads may be uesd in place of the tubes 32.

The construction adopted for the heating elements enables their parts to be produced at a relatively low cost and their assembly and interconnection to be carried out speedily and efficiently with comparatively unskilled labour.

A suitable thermostatic device may be provided and adapted to automatically control the supply of electric current to the heating element according to the temperature of the liquid in the reservoir, such thermostat being adapted to operate a suitable switch (not shown) interposed in the circuit of the heating element. For this purpose a lead 64 from a source of electric current may be connected to one terminal of the control switch, another lead 64a being connected to the aforesaid terminal 29a of the heating element, while the other terminal 29 of the heating element is connected by a conductor 68 to the other terminal of the control switch.

If desired, the reservoir 2 may be of upwardly converging formation so that the liquid, as it rises within the reservoir, is concentrated into a smaller space around the heating element or elements. The reservoir may be enclosed by an outer shell 33 which is spaced therefrom, the resultant annular space being filled with suitable lagging or heating insulating material 34 such as cork. Alternatively, instead of employing such lagging, the supply liquid may be introduced directly into the space between the reservoir and the outer shell as seen in Figure 1, whereby loss of heat by radiation is minimized and the liquid preheated before passing through the inlet opening 4 into the reservoir. A baffle 36 may be located within the reservoir so as to extend downwardly around the inlet opening 4 to thereby prevent a swirling action being set up by the incoming liquid.

According to the embodiment of the invention illustrated in Figure 1 there are two separate and independent draw off pipes 6 and 60 and means are provided whereby only boiling water can be drawn off by the pipe 60 while water at any temperature prevailing within the reservoir 2 may be drawn off from the other pipe 6. The heater may thus simultaneously supply boiling water for making tea or for other purposes, and hot water for various purposes such, for example, as washing dishes. In accordance with this embodiment within the reservoir 2 and adjacent the cover or top 2b thereof is a baffle or partition plate 74, having a vertical orifice 76 adapted to register with the upper end of the central tube 13 of the hollow heating element 11. The upper end portion of the casing 12 of the heating element, or the cap 17, may be a close fit within the orifice of the partition and, if desired, a lip 77 may depend from said partition around the orifice for attachment to said casing 12, or said cap 17. The partition plate 74 thus forms at the upper part of the reservoir 2 a chamber 75, hereinafter referred to as the boiling water chamber, which is disposed above the normal level of the water within the reservoir and is in communication with the lower part of the reservoir by way of the internal passageway of the hollow heating element.

Formed in the wall of the reservoir immediately above the upper surface of the partition plate 74 is a boiling water outlet opening 78 from which outstands the boiling water draw off pipe 60. This pipe passes through the heat insulating space and the outer shell around the reservoir and is fitted with a control tap 60a. The said partition plate is preferably inclined upwardly from that side which is nearest the said boiling water outlet so that boiling water gushing or spouting from the open upper end of the hollow heating element into the boiling water chamber 75 will be directed towards said boiling water outlet opening 78 and draw off pipe 60. A safety or escape opening 79 may be formed in said inclined partition plate near its highest point through which excess boiling water may pass from said boiling water chamber into the main body of water in the reservoir 2. A steam vent may, if desired, be provided in the top or cover 2b.

Leading from the reservoir beneath the said partition plate is the second or hot water draw off pipe 6. This pipe may extend downwardly for a certain distance and then pass sidewardly through and out of the reservoir and the outer shell and may terminate in a suitable nozzle or spout.

A heater according to Figure 1 operates so that cold water entering the reservoir is induced upwardly through the hollow heating element, due to thermo syphonic action, and is raised in temperature to boiling point. The boiling water gushes or spouts from the top of the heating element into the boiling water chamber 75 from which it may be drawn off as required by manipulation of the draw off cock 60a. Any excess boiling water passes through the escape opening 79 in said partition plate 74 into the main body of water underneath. The main body of water below the partition plate is thus raised in temperature by conduction from the casing 12 around the heating element and also by convection from any boiling water falling through the partition plate. Although the draw off pipe 6 has been termed hot water draw off pipe it may happen that the main body of water will be raised in temperature to boiling point whereupon both draw off pipes 60 and 6 will deliver boiling water.

According to the embodiment illustrated in Figure 2, a cold or feed liquid chamber, formed by a transverse bottom plate or partition 71 and an upward extension of the outer shell 33, is disposed above, and insulated from the reservoir 2, a supply pipe 3 leading from an outlet in the bottom of the feed chamber to the inlet opening 4 in the lower part of the reservoir 2. The feed chamber may be connected by a feed pipe with a water main or, if desired, it may be independent of any regular water supply, in which case, cold water may be introduced into the feed chamber by a dipper as and when required. An expansion or safety pipe 72 may lead from an outlet adjacent the top of the hot water reservoir 2 into the top of the feed chamber to conduct steam away from the reservoir 2.

The invention is also applicable to hot water service installations for household use and the like. In such cases the reservoir 2 (see Figure 4) with one or more of the hollow electric heating units 11 operatively mounted therein may be disposed in any convenient position. A cold water supply pipe 3 may lead from an elevated cistern 81, provided with a float controlled or other suitable control valve, to an inlet opening 4 in the lower part of the reservoir which is enclosed by an outer shell 33 and suitably lagged as at 34.

Upstanding from an outlet opening at the top of the reservoir is an outlet pipe 83 which may communicate at its upper end with valve 84 to which a branch outlet pipe 86 and a safety or steam escape pipe 87 are also connected. The pipe 86 conducts the hot water to various delivery pipes 88 each of which is fitted with a control cock. The valve 84 is normally closed to the pipe 87 but should excessive steam pressure occur the valve is automatically opened to allow the steam to escape into the cistern. If desired a hot water delivery pipe 91 may lead from an opening near the top of the reservoir 2 to the various draw off stations, at which control cocks 92 are fitted, and thence return to an opening near the bottom of the reservoir. A continuous flow of hot water through the pipe 91 is thus ensured so that hot water is instantly available at the draw off stations.

In Figure 4 the heating units 11 are shown suspended within the reservoir 2 in an inverted attitude. The fitting 19 at the upper end of each heating element is in the form of a screw cap which may be screwed into the reservoir wall or into a mounting plate 22 suitably secured to the top of the reservoir around an opening therein. Coinciding apertures 94 are formed through that portion of each screw cap fitting which enters the reservoir, and the central tube 13 of the respective heating element to enable the heated liquid to pass from said tube into the liquid space at the upper part of the reservoir. The insulatory tubes 32 may terminate at their outer ends in insulatory plates 27 attached to said screw cap fittings 19 and provided with suitable terminals 29, 29$^a$ for electric leads.

The outer shell may be fitted with a displaceable lid 96. A thermostatic operated device as previously mentioned may be also incorporated in this embodiment to control the supply of current to the heating element.

Bushes 97 of any suitable material which is not a good conductor of heat may surround the various pipes conducting the heated liquid, where the pipes pass through the outer shell 33.

Having now described my invention what I claim as new and desire to secure by Letters Patent is:—

1. Improvements in and relating to electric liquid heaters of the kind having one or more heating elements each comprising a tube which has an electric resistance applied to the exterior thereof and is located within an outer casing adapted for mounting within a liquid reservoir so that the liquid is heated within, and is induced upwardly through, said tube and issues from the top thereof; characterized in that said resistance covered tube is of relatively small diameter, and that said outer casing is of relatively large diameter and is spaced concentrically about said tube so as to provide between the tube and the casing a heat insulating chamber, whereby the heating effect of said resistance is concentrated about said tube, said casing being fitted at its ends with end closures or fittings having openings which register with the ends of said heating tube, one of said end fittings being of a flexible or expansible nature, for the purpose specified.

2. Improvements in and relating to electric liquid heaters as claimed in claim 1, wherein said flexible or expansible end fitting comprises a thin metal cap which is fastened around its peripheral edge to one end of said outer casing and has a central opening to accommodate the adjacent end portion of said heating tube which is retained to the cap by screw means, for the purpose specified.

3. Improvements in and relating to electric liquid heaters as claimed in claim 1, wherein the other of said end fittings is provided with screw means, whereby it may be detachably connected to said reservoir, and has passages through which tubes of insulatory material extend to accommodate conductors leading from the resistance around said heating tube to terminals located externally of said reservoir, one of said insulatory tubes being relatively short and the other relatively long, substantially as and for the purpose specified.

In testimony whereof I affix my signature.

T. H. McQUINN.